(12) United States Patent
Wei et al.

(10) Patent No.: US 9,878,302 B2
(45) Date of Patent: Jan. 30, 2018

(54) GRAPHENE AND CARBON NANOTUBE COMPOSITIONS

(75) Inventors: Liangming Wei, Shanghai (CN); Yafei Zhang, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 135 days.

(21) Appl. No.: 14/428,186

(22) PCT Filed: Sep. 14, 2012

(86) PCT No.: PCT/CN2012/081411
§ 371 (c)(1),
(2), (4) Date: Mar. 13, 2015

(87) PCT Pub. No.: WO2014/040275
PCT Pub. Date: Mar. 20, 2014

(65) Prior Publication Data
US 2015/0238929 A1 Aug. 27, 2015

(51) Int. Cl.
*B82Y 30/00* (2011.01)
*B01J 20/20* (2006.01)
(Continued)

(52) U.S. Cl.
CPC ............ *B01J 20/205* (2013.01); *B01D 15/08* (2013.01); *B01D 53/04* (2013.01); *B01J 20/22* (2013.01); *B01J 20/28038* (2013.01); *B01J 20/3204* (2013.01); *B01J 20/3219* (2013.01); *B01J 20/3248* (2013.01); *B82Y 30/00* (2013.01); *B82Y 40/00* (2013.01); *C01B 32/174* (2017.08); *C01B 32/194* (2017.08); *C02F 1/283* (2013.01); *C02F 1/4691* (2013.01);
(Continued)

(58) Field of Classification Search
CPC .. H01G 9/058; H01G 9/04; H01G 9/24; H01G 11/36; H01B 1/02; H01B 1/04; B82Y 30/00
See application file for complete search history.

(56) References Cited

U.S. PATENT DOCUMENTS 7,074,310 B2 7/2006 Smalley et al.
8,455,842 B2 6/2013 Zhang et al.
(Continued)

FOREIGN PATENT DOCUMENTS

CN 102194633 A 9/2011
CN 102412065 A 4/2012

OTHER PUBLICATIONS

Allen, MJ., et al., "Honeycomb Carbon: A Review of Graphene," Chem. Rev., vol. 110, Issue 1, pp. 132-145 (Jan. 2010).
(Continued)

*Primary Examiner* — Nguyen Ha
(74) *Attorney, Agent, or Firm* — Dorsey & Whitney LLP

(57) ABSTRACT

Compositions having carbon nanotubes and two or more graphene sheets are disclosed. The carbon nanotubes can be interposed between the graphene sheets within the composition. Applicants have surprisingly found that, in some embodiments, these compositions exhibit superior absorbent and/or electrical properties. The present application also includes methods of making and using these compositions, and capacitors including these compositions.

24 Claims, 11 Drawing Sheets

(51) Int. Cl.
*C02F 1/469* (2006.01)
*B82Y 40/00* (2011.01)
*B01J 20/28* (2006.01)
*B01J 20/32* (2006.01)
*B01D 15/08* (2006.01)
*B01D 53/04* (2006.01)
*B01J 20/22* (2006.01)
*C02F 1/28* (2006.01)
*C01B 32/174* (2017.01)
*C01B 32/194* (2017.01)
*H01G 11/36* (2013.01)
*C02F 101/20* (2006.01)
*C02F 101/32* (2006.01)
*C02F 103/04* (2006.01)

(52) U.S. Cl.
CPC .... *B01D 2253/102* (2013.01); *B01D 2257/60* (2013.01); *B01D 2257/702* (2013.01); *B01D 2257/708* (2013.01); *C02F 2101/20* (2013.01); *C02F 2101/32* (2013.01); *C02F 2101/322* (2013.01); *C02F 2103/04* (2013.01); *H01G 11/36* (2013.01)

(56) References Cited

U.S. PATENT DOCUMENTS

| | | | | |
|---|---|---|---|---|
| 8,906,495 | B2* | 12/2014 | Chen | B82Y 10/00 427/212 |
| 9,453,118 | B2* | 9/2016 | Kim | D01D 1/02 |
| 2005/0147553 | A1 | 7/2005 | Wong et al. | |
| 2006/0122451 | A1 | 6/2006 | Petrik | |
| 2008/0023396 | A1 | 1/2008 | Fugetsu | |
| 2009/0087493 | A1* | 4/2009 | Dai | A61K 9/0092 424/490 |
| 2010/0105834 | A1* | 4/2010 | Tour | B82Y 30/00 525/50 |
| 2011/0186789 | A1 | 8/2011 | Samulski et al. | |
| 2012/0152725 | A1* | 6/2012 | Barker | B82Y 30/00 204/157.44 |
| 2013/0295374 | A1* | 11/2013 | Tang | B82B 1/002 428/323 |

OTHER PUBLICATIONS

Baughman, RH, et al., "Carbon Nanotubes—the Route Toward Applications," Science, vol. 297, Issue 5582, pp. 787-792 (Aug. 2, 2002).

Cinke, M., et al., "Pore structure of raw and purified HiPco single-walled carbon nanotubes," Chemical Physics Letters, vol. 365, Issues 1-2, pp. 69-74 (Oct. 28, 2002).

Hummers Jr., W. S., and Offeman, R. E., "Preparation of Graphitic Oxide," J. Am. Chem. Soc., vol. 80, p. 1339 (Mar. 20, 1958).

International Search Report for International Patent Application No. PCT/CN2012/081411, dated Jun. 20, 2013.

Jeong, H. Y., et al., "Flexible room-temperature NO2 gas sensors based on carbon nanotubes/reduced graphene hybrid films," Applied Physics Letters, vol. 96, pp. 213105-1-213105-3 (2010).

Lee, D. H., et al., "Versatile Carbon Hybrid Films Composed of Vertical Carbon Nanotubes Grown on Mechanically Compliant Graphene Films," Advanced Materials, vol. 22, Issue 11, pp. 1247-1252 (Mar. 19, 2010).

Lee, J., et al., "Recent Progress in the Synthesis of Porous Carbon Materials," Advanced Materials—Advan Mater, vol. 18, Issue 16, pp. 2073-2094 (2006).

Liang Dr., et al., "Mesoporous Carbon Materials: Synthesis and Modification," Angewandte Chemie International Edition, vol. 47, Issue 20, pp. 3696-3717 (May 5, 2008).

Yu, D., and Dai, L., "Self-Assembled Graphene/Carbon Nanotube Hybrid Films for Supercapacitors," The Journal of Physical Chemistry Letters, vol. 1, Issue 2, pp. 467-470 (2010).

Zhao, L., et al., "Developments in researches for preparation and application of activated carbon," Science, technology and Engineering, vol. 8, Issue 11, p. 1671 (2008).

Zhou, D., and Han, B., Graphene-Based Nanoporous Materials Assembled by Mediation of Polyoxometalate Nanoparticles, Advanced Functional Materials, vol. 20, Issue 16, pp. 2717-2722 (Aug. 23, 2010).

* cited by examiner

GRAPHENE AND CARBON NANOTUBE COMPOSITIONS

This application is the U.S. National Phase under 35 U.S.C. §371 of International Application No. PCT/CN2012/081411, filed on Sep. 14, 2012, which is hereby incorporated by reference in its entirety.

BACKGROUND

Pollution of aqueous solutions and air is an expanding issue in the modern world. An ever-growing number of toxic pollutants are produced by industries, such as, for example, textile industries, chemical industries, pharmaceutical industries, pulp and paper industries, and food processing plants. The majority of these toxic pollutants are released within two primary fluid physical states: water and air. As the scope of water and air-borne pollutant production increases worldwide, the concerns over the risks imposed by these released pollutants on the environment also increases. Additionally, environmental regulations are requiring that these released fluid streams contain less and less pollutants. In fact, some treatment processes that were acceptable options at one point in time are now obsolete because more stringent treatment standards are required as new environmental regulations are implemented.

A variety of wastewater purification methods have been developed. Some techniques for removing the contaminants involve using absorbent carbon materials to remove pollutants from fluids. For example, carbon filters can be used to treat drinking water.

SUMMARY

Some embodiments disclosed herein include a composition having two or more graphene sheets and carbon nanotubes disposed between the graphene sheets.

Some embodiments disclosed herein include a method for removing one or more components from a fluid, the method can include contacting the fluid with a composition having two or more graphene sheets and carbon nanotubes, wherein the carbon nanotubes are disposed between the graphene sheets.

Some embodiments disclosed herein include a method of making a composition, the method can include combining graphene sheets and carbon nanotubes in a solution, wherein the graphene sheets are functionalized with a negatively charged group, and the carbon nanotubes are functionalized with an amine salt or an ammonium salt.

Some embodiments disclosed herein include a method of making a composition, the method can include combining graphene sheets and carbon nanotubes in a solution, wherein the graphene sheets are functionalized with an amine salt or an ammonium salt, and the carbon nanotubes are functionalized with a negatively charged group.

Some embodiments disclosed herein include a method of making a composition, the method can include: combining graphite with a strong acid to form graphene sheets, the strong acid having a pH of about 2 or less; and combining carbon nanotubes with the strong acid.

Some embodiments disclosed herein include a method of making a composition, the method comprising: combining graphene sheets with a first ionic surfactant having a first charge to form a first solution; combining carbon nanotubes with a second ionic surfactant having a second charge to form a second solution, the second charge being opposite to the first charge; and combining the first solution and the second solution to form a mixture.

Some embodiments disclosed herein include a composition obtained by any of the methods disclosed in the present application.

Some embodiments disclosed herein include a capacitor having: a first electrode; a second electrode; and a composition disposed between the first electrode and the second electrode, wherein the composition includes two or more graphene sheets and carbon nanotubes disposed between the graphene sheets.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
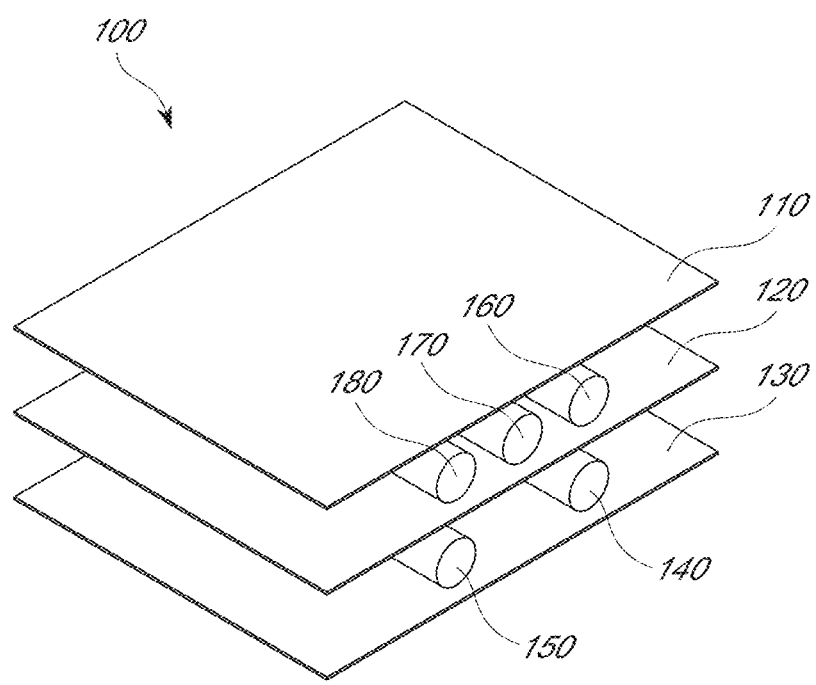
FIG. 1 shows one example of a carbon nanotube-graphene sheet composition that is within the scope of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the present application includes compositions having carbon nanotubes and two or more graphene sheets. The carbon nanotubes can be interposed between the graphene sheets within the composition. Applicants have surprisingly found that, in some embodiments, these compositions exhibit superior absorbent and/or electrical properties. The present application also includes methods of making and using these compositions, and capacitors including these compositions.

Carbon Nanotube-Graphene Sheet Compositions

Some embodiments disclosed herein include a composition having two or more graphene sheets and carbon nanotubes disposed between the graphene sheets. FIG. 1 shows one example of a carbon nanotube-graphene composition that is within the scope of the present application. The composition includes structure 100 having graphene sheet 110, graphene sheet 120, and graphene sheet 130. Carbon nanotube 140 and carbon nanotube 150 are both disposed between graphene sheet 120 and graphene sheet 130 in assembly 100. Carbon nanotube 160, carbon nanotube 170, and carbon nanotube 180 are each disposed between graphene sheet 110 and graphene sheet 120 in assembly 100. As shown in FIG. 1, the spacing between the graphene sheets is larger than the distance between the graphene sheets and the nearest carbon nanotube. For example, the distance between graphene sheet 110 and graphene sheet 120 is greater than the distance between carbon nanotube 160 and graphene sheet 110.

FIG. 1 provides one example of a composition that is within the scope of the present application, however the present application is not limited to the depicted structure. For example, the number and relative amount of assemblies, carbon nanotubes, and graphene sheets in the composition can vary. As another example, the carbon nanotubes may be overlapping, intertwined, or form ropes disposed between the graphene the sheets.

The carbon nanotubes in the composition may vary. For example, the carbon nanotubes can include one or more of single-walled carbon nanotubes, double-walled carbon nanotubes, or multi-walled carbon nanotubes. The carbon nanotubes may include semi-conducting carbon nanotubes, metallic carbon nanotubes, or a mixture of both. The carbon nanotubes may, for example, have an average length of at least about 50 nm, at least about 100 nm, or at least about 500 nm. The carbon nanotubes may, for example, have an average diameter of less than or equal to about 100 nm, less than or equal to about 50 nm, less than or equal to about 10 nm, or less than or equal to about 5 nm.

The carbon nanotubes may be coupled, fixed, or preferentially located between graphene sheets by non-covalent interactions, such as non-polar interactions and polar interactions. For example, as will discussed further below, the carbon nanotubes and graphene sheets may be functionalized with polar groups that form favorable polar interactions. As another example, the carbon nanotubes may be non-functionalized and form favorable non-polar interactions, such as van der Waals or pi-stacking interactions.

The carbon nanotubes may, in some embodiments, be functionalized with one or more negatively charged groups. The total charge of the functionalized carbon nanotubes can be negative. Non-limiting examples of suitable negatively charged groups include a carboxyl group, a boronic acid group, a phosphonic acid group, and a sulfamic acid group. A combination of two or more of these groups may optionally be used. In some embodiments, the carbon nanotubes are functionalized with a carboxyl. The carbon nanotubes can be functionalized with negatively charged groups using standard chemical procedures. For example, carbon nanotubes can be functionalized with a carboxyl group by reacting with nitric acid. Without being bound to any particular theory, it is believed that the negatively charged group can reduce carbon nanotube aggregation and provide favorable polar interactions to preferentially locate the carbon nanotubes between the graphene sheets.

In some embodiments, the carbon nanotubes are not functionalized. For example, the carbon nanotubes can be pristine carbon nanotubes. In some embodiments, the carbon nanotubes have a neutral charge. Without being bound to any particular theory, it is believed that non-functionalized carbon nanotubes can form non-polar interactions to preferentially locate the carbon nanotubes between the graphene sheets.

The size of the graphene sheets is not particularly limited. The graphene sheets may have an average surface area of, for example, at least about 100 $nm^2$, at least about 200 $nm^2$, at least about 500 $nm^2$, or at least about 1000 $nm^2$. The spacing between the graphene sheets will be larger than spacing typically exhibited in graphite (e.g., the spacing between graphene sheet 110 and graphene sheet 120 as depicted in FIG. 1). For example, the graphene sheets may be at least about 1 nm apart, or at least about 5 nm apart.

The graphene sheets may, in some embodiments, be functionalized with one or more negatively charged groups. The total charge of the functionalized graphene sheets can be negative. Non-limiting examples of suitable negatively charged groups include a carboxyl group, a boronic acid group, a phosphonic acid group, and a sulfamic acid group. A combination of two or more of these groups may optionally be used. In some embodiments, the graphene sheets are functionalized with a carboxyl group. The negatively charged group on the graphene sheets can be the same or different than the negatively charged group on the carbon nanotubes. For example, the carbon nanotube may be functionalized with a boronic acid group, while the graphene sheets may be functionalized with phosphonic acid group. As another example, the carbon nanotubes and graphene sheets may both be functionalized with carboxyl groups. The graphene sheets can be functionalized using standard chemical techniques. For example, graphite may be subjected to the standard Hummers process to yield graphene sheets functionalized with carboxyl groups (e.g., graphene oxide).

The composition may optionally include ammonium ions or substituted ammonium ions disposed between the graphene sheets. In some embodiments, the composition includes graphene functionalized with a negatively charged group, carbon nanotubes functionalized with a negatively charged group, and ammonium ions or substituted ammonium ions disposed between the graphene sheets. The ammonium ions or substituted ammonium ions may form a salt with carbon nanotubes or graphene sheets. Without being bound to any particular theory, it is believed that the ammonium ions may be preferentially disposed between the negatively charged groups on the carbon nanotubes and graphene sheets to form favorable polar interactions. The ammonium ion and substituted ammonium ions are optional, and therefore some embodiments do not include these components.

The substituted ammonium ions can include, for example, a primary ammonium ion, a secondary ammonium ion, a tertiary ammonium ion, or a quaternary ammonium ion. The substituted ammonium ions may, in some embodiments, be represented by formula (I):

where $R^1$, $R^2$, $R^3$, and $R^4$ are each independently hydrogen or a hydrocarbon having 1 to 12 carbons. In some embodiments, $R^1$, $R^2$, $R^3$, and $R^4$ are each independently hydrogen, an alkyl having 1 to 12 carbons, or an aryl having 5-10 carbons. In some embodiments, $R^1$ and $R^2$ can be taken together to form a nitrogen-containing heterocycle. For example, the substituted ammonium ion can be a protonated pyrrolidine.

The substituted ammonium ion may be a polyamine having two or more cationic amino groups covalently bonded to a hydrocarbon. Non-limiting examples include protonated forms of piperazine; alkylene diamines, such as ethylenediamine, 1,3-propylenediamine, 1,4-butylenediamine; diethylenetriamine; triethylenetetramine; tetraethylenetetramine; and the like. The substituted ammonium ions may, in some embodiments, be represented by formula (II): $NH_3^+$—$(CH_2)_n$—$NH_3^+$, wherein n is 1 to 12.

As will be discussed further below, ammonium ions or substituted ammonium ions can form a salt with the functionalized carbon nanotubes (e.g., an ammonium salt). This salt can be combined with the functionalized graphene sheets to produce a composition having carbon nanotubes disposed between the graphene sheets. Similarly, a salt can be formed with the graphene sheets and then combined with the carbon nanotubes to yield the composition.

The composition may, in some embodiments, include a cationic surfactant and an anionic surfactant both disposed between the graphene sheets. Non-limiting examples of cationic surfactants include octenidine dihydrochloride; alkyltrimethylammonium salts, such as cetyl trimethylammonium bromide (CTAB), dodecyl trimethylammonium bromide (DTAB); cetylpyridinium chloride (CPC); polyethoxylated tallow amine (POEA); benzalkonium chloride (BAC); benzethonium chloride (BZT); 5-bromo-5-nitro-1, 3-dioxane; dimethyldioctadecylammonium chloride; and dioctadecyldimethylammonium bromide (DODAB). Non-limiting examples of anionic surfactants include alkyl sulfates, such as ammonium lauryl sulfate, sodium dodecyl sulfate (SUS); alkyl ether sulfates, such as sodium laureth sulfate, sodium myreth sulfate; sulfonates, such as dioctyl sodium sulfosuccinate; sulfonate fluorosurfactants, such as perfluorooctanesulfonate (PFOS), perfluorobutanesulfonate; alkyl benzene sulfonates; phosphates, such as alkyl aryl ether phosphate, alkyl ether phosphate; carboxylates, such as alkyl carboxylates; fatty acid salts (soaps), such as sodium stearate; sodium lauroyl sarcosinate; carboxylate fluorosurfactants: perfluorononanoate, perfluorooctanoate (PFOA or PFO). Other examples of suitable ionic surfactants are disclosed in U.S. Pat. No. 7,074,310. Without being bound to any particular theory, it is believed that the hydrophobic portions of these surfactants can form favorable non-polar interactions with the graphene sheets and carbon nanotubes, while oppositely charged ionic portions of the surfactants can form favorable polar interactions. These interactions may together preferentially locate the carbon nanotubes between the graphene sheets. The cationic surfactants and anionic surfactants are optional, and therefore some embodiments of the composition do not include these surfactants.

The amount by weight of ionic surfactants relative to the total amount by weight of carbon nanotubes and graphene sheets can be, for example, at least about 1:10, at least about 1:5, at least about 1:3, at least about 1:2, at least about 1:1, or at least about 2:1. The amount by weight of ionic surfactants relative to the total amount by weight of carbon nanotubes and graphene sheets can be, for example, less than or equal to about 10:1, less than or equal to about 5:1, less than or equal to about 2:1, less than or equal to about 1:1, less than or equal to about 1:2, or less than or equal to about 1:5. In some embodiments, the amount by weight of ionic surfactants relative to the total amount by weight of carbon nanotubes and graphene sheets is about 1:10 to about 10:1, or about 1:2 to about 2:1.

The composition can have various forms. In some embodiments, the composition is a suspension. For example, a powder including the carbon nanotubes and graphene sheets can be dispersed in a liquid, such as water or an organic solvent. In some embodiments, the composition is a solid. The composition can also be porous or non-porous. For example, the composition can have an average pore size of less than or equal to about 6 nm, or less than or equal to about 4 nm. The composition may also be in a granular form, such as a powder. The granular composition may have an average particle size of, for example, less than about 1 mm, less than about 500 µm, or less than about 100 µm.

The relative amount of carbon nanotubes and graphene sheets in the composition may vary. The relative amount of carbon nanotubes to graphene sheets by weight can be, for example, at least about 1:5, at least about 1:3, at least about 1:2, at least about 1:1, at least about 2:1, at least about 3:1, or at least about 4:1. The relative amount of carbon nanotubes to graphene sheets by weight can be, for example, less than or equal to about 5:1, less than or equal to about 3:1, less than or equal to about 2:1, less than or equal to about 1:1, less than or equal to about 1:2, less than or equal to about 1:3, or less than or equal to about 1:4. In some embodiments, the relative amount of carbon nanotubes to graphene sheets by weight is 1:5 to 5:1. In some embodiments, the relative amount of carbon nanotubes to graphene sheets by weight is 1:2 to 2:1.

The total amount of graphene sheets in the composition may also vary. For example, the total amount may be diluted by additional materials, such as solvents, binders, and the like. The total amount of graphene sheets in the composition can be, for example, at least about 1% by weight, at least about 10% by weight, at least about 25% by weight, at least about 40% by weight, at least about 50% by weight, at least about 60% by weight, or at least about 75% by weight. The total amount of graphene sheets in the composition can be, for example, less than or equal to about 90% by weight, less than or equal to about 75% by weight, less than or equal to about 60% by weight, less than or equal to about 50% by weight, less than or equal to about 40% by weight, less than or equal to about 25% by weight, less than or equal to about 100% by weight, or less than or equal to about 5% by weight. In some embodiments, the total amount of graphene sheets in the composition is about 1% to about 90% by weight.

The total amount of carbon nanotubes in the composition may also vary. The total amount of carbon nanotubes in the composition can be, for example, at least about 1% by weight, at least about 10% by weight, at least about 25% by weight, at least about 40% by weight, at least about 50% by weight, at least about 60% by weight, or at least about 75% by weight. The total amount of carbon nanotubes in the composition can be, for example, less than or equal to about 90% by weight, less than or equal to about 75% by weight, less than or equal to about 60% by weight, less than or equal to about 50% by weight, less than or equal to about 40% by weight, less than or equal to about 25% by weight, less than or equal to about 10% by weight, or less than or equal to about 5% by weight. In some embodiments, the total amount of carbon nanotubes in the composition is about 1% to about 90% by weight.

Numerous other materials can be optionally included in the composition to modify the characteristics of the composition. Non limiting examples of additional materials include polymers, placticizers, organic solvents, binders, sulfur, metal oxide nanoparticles, and the like. For example, the composition can include an epoxy to form a rigid composited. In some embodiments, the composition can include a polymer having a high dielectric strength (e.g., at least about 10 MV/m or at least about 25 MV/m). The polymer can be, in some embodiments, a polyolefin, such a polyethylene, polypropylene, polybutene-1, polymethylpentene, and the like. The amount of these optional materials in the composition may be, for example, at least about 1% by weight, at least about 100% by weight, or at least about 25% by weight.

The composition can, in some embodiments, be an activated carbon. Techniques for activating carbon materials are known in the art and generally include pyrolyzing carbon materials at high temperatures to increase the surface area and/or adsorption characteristics.

The compositions may, in some embodiments, have a high surface area. The high surface may advantageously provide superior absorption properties. The composition may, for example, have a BET surface area of at least about 400 $m^2/g$, at least about 500 $m^2/g$, at least about 700 $m^2/g$, at least about 1000 $m^2/g$, or at least about 1500 $m^2/g$. In some embodiments, the composition has a BET surface area of about 400 $m^2/g$ to about 2500 $m^2/g$.

The compositions may, in some embodiments, exhibit a high capacitance which may be useful in various electrical applications. The composition may, for example, have a capacitance of at least about 75 F/g, at least about 100 F/g, at least about 140 F/g, or at least about 250 F/g. In some embodiments, the compositions can have a capacitance of about 75 F/g to about 250 F/g.

Methods of Making the Carbon Nanotube-Graphene Sheet Composition

Some embodiments disclosed herein include methods of making a composition including carbon nanotubes and graphene sheets. The methods may, in some embodiments, be used to obtain any of the compositions disclosed in the present application.

Figure 2:
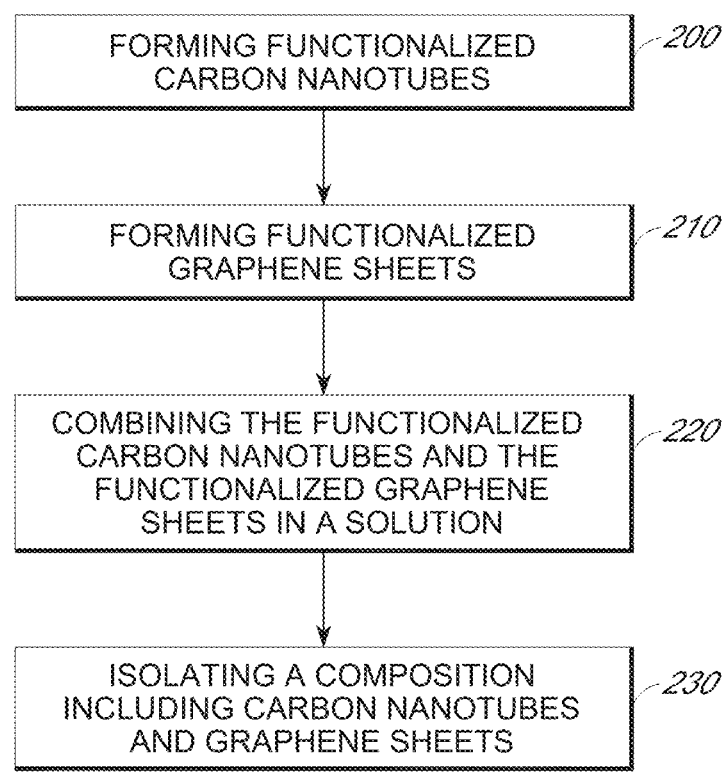
FIG. 2 is a flow diagram showing one example of a process for making compositions within the scope of the present application.

FIG. 2 is a flow diagram showing one example of a process for making the compositions within the scope of the present application. The method of making the composition can include: "Forming functionalized carbon nanotubes", illustrated in block 200; "Forming functionalized graphene sheets", as illustrated in block 210; "Combining the functionalized carbon nanotubes and the functionalized graphene sheets in a solution", as illustrated in block 220; and "Isolating a composition including carbon nanotubes and graphene sheets", as illustrated in block 230. Although operations 200, 210, 220, and 230 may be performed sequentially, it will be appreciated that one or more of these operations may be performed at about the same time. These operations may also be performed in a different order than is depicted in FIG. 2.

At operation 200 "Forming functionalized carbon nanotubes", carbon nanotubes can be functionalized with a negatively charged group. The carbon nanotubes can have generally the same properties as discussed above with regard to the composition. For example, the carbon nanotubes can include one or more of single-walled carbon nanotubes, double-walled carbon nanotubes, or multi-walled carbon nanotubes. The carbon nanotubes may also include semiconducting carbon nanotubes, metallic carbon nanotubes, or a mixture of both. The raw carbon nanotubes are commercially available or can be obtained using standard procedures, such as chemical vapor deposition, arc discharge, and laser ablation.

The carbon nanotubes can be reacted with a suitable oxidation reagent at temperatures of, for example, about 20° C. to about 120° C., to functionalize the carbon nanotubes with a carboxyl group. Non-limiting examples of oxidation reagents include nitric acid, sulfuric acid, perchloric acid, potassium dichromate, potassium permanganate, and mixtures thereof. The functionalized carbon nanotubes may then be optionally washed using water and dilute hydrochloric acid. The functionalized carbon nanotubes can be dispersed in aqueous solution using, for example, ultrasonication.

Other functional groups may similarly be functionalized to the carbon nanotubes. As an example, the carbon nanotubes may be functionalized with a hydroxyl group using an appropriate oxidizing agent, and then reacted with a phosphorylating agent (e.g., $POCl_3$) to form a phosphonic acid group. As another example, the carbon nanotubes can be reacted with sulfuric acid to add sulfonic acid groups. Other known chemical procedures may be used to functionalize the carbon nanotubes. For example, U.S. Publication No. 2005/0147553 discloses processes for functionalizing carbon nanotubes by exposing the carbon nanotubes to ozone.

The degree of functionalization in the carbon nanotubes may be varied. The percentage of carbon atoms bonded to a functional group in the functionalized carbon nanotubes may be, for example, at least about 0.01%, at least about 0.1%, at least about 1%, at least about 5%, or at least about 20%. The percentage of carbon atoms bonded to a functional group in the functionalized carbon nanotubes may be, for example, less than or equal to about 15%, less than or equal to about 5%, less than or equal to about 3%, or less than or equal to about 1%. In some embodiments, the percentage of carbon atoms bonded to a functional group in the functionalized carbon nanotubes is from 0.010% to about 15%.

The functionalized carbon nanotubes may optionally be combined with an ammonium ion or substituted ammonium ion. This may result in a salt. The substituted ammonium ion can have the same characteristics as described above with regard to the composition. For example, the substituted ammonium ion can be represented by formulae (I) or (II), or may be, for example, protonated ethylene diamine or protonated pyrrolidine. Combining the ammonium ion or substituted ammonium ion can include combining non-protonated amines (e.g., ammonia) with the functionalized carbon nanotubes which can be protonated in solution at an appropriate pH. In some embodiments, the functionalized carbon nanotubes can be combined with an aqueous ammonia solution or an aqueous alkylene diame solution (e.g., ethylene diamine).

The functionalized carbon nanotubes may be optionally dispersed in a solvent, such as water for further processing. The functionalized carbon nanotubes may, for example, have a solubility in water of at least about 0.01 mg/mL, at least about 0.05 mg/mL, at least about 0.1 mg/mL, or at least about 0.3 mg/mL.

At operation 210 "Forming functionalized graphene sheets", graphene sheets can be functionalized with a negatively charged group. The graphene sheets can have generally the same properties as discussed above with regard to the composition. In some embodiments, the graphene sheets may be formed using a Hummers process that can yield carboxyl functional groups. Various other functional groups may also be included on the graphene sheets using standard chemical techniques. For example, a phosphorylating agent can be used to form phosphonic acid at hydroxyl groups in the graphene sheets. As another example, U.S. Publication No. 2011/0186789 provides various examples of techniques for functionalizing graphene sheets that may be used in the processes disclosed herein.

The degree of functionalization in the graphene sheets may be varied. The percentage of carbon atoms bonded to a functional group in the functionalized graphene sheets may be, for example, at least about 0.01%, at least about 0.1%, at least about 1%, at least about 5%, or at least about 10%. The percentage of carbon atoms bonded to a functional group in the functionalized graphene sheets may be, for example, less than or equal to about 15%, less than or equal to about 5%, less than or equal to about 3%, or less than or equal to about 1%. In some embodiments, the percentage of carbon atoms bonded to a functional group in the functionalized graphene sheets is from 0.010% to about 15%.

The functionalized graphene sheets may optionally be combined with an ammonium ion or substituted ammonium ion. This may result in a salt. The substituted ammonium ion can have the same characteristics as described above with regard to the composition. For example, the substituted ammonium ion can be represented by formulae (I) or (II), or may be, for example, protonated ethylene diamine or protonated pyrroline. Combining the ammonium ion or substituted ammonium ion can include combining non-protonated amines (e.g., ammonia) with the functionalized graphene sheets which can be protonated in solution at an appropriate pH. In some embodiments, the functionalized graphene sheets can be combined with an aqueous ammonia solution or an aqueous alkylene diame solution (e.g., ethylene diamine).

The functionalized graphene sheets may be optionally dispersed in a solvent, such as water for further processing. The functionalized graphene sheets may, for example, have a solubility in water of at least about 0.01 mg/mL, at least about 0.05 mg/mL, at least about 0.1 mg/mL, or at least about 0.3 mg/mL.

At operation 220 "Combining the functionalized carbon nanotubes and the functionalized graphene sheets in a solution", the functionalized carbon nanotubes and graphene sheets are combined in a solution to form the composition. Both the carbon nanotubes and graphene sheets can be sufficiently dispersed in the solution so that the carbon nanotubes may be interposed between the graphite sheets. Sufficient dispersion may be obtained, for example, by ultrasonicating or high-shear mixing the solution for a sufficient time period.

In some embodiments, the carbon nanotubes are dispersed in a first solution containing a first solvent, and the graphene sheets are dispersed in a second solution containing a second solvent. The first solution and the second solution can be combined (e.g., mixed together) to form the composition. The first solvent and the second solvent can be the same or different. In some embodiments, the first solvent and the second solvent both include water.

The functionalized carbon nanotubes and/or the functionalized graphene sheets may include an ammonium ion or substituted ammonium ion as discussed above. In some embodiments, the functionalized carbon nanotubes include an ammonium ion or substituted ammonium ion, and the functionalized graphene sheets do not include (or are substantially free of) ammonium ions or substituted ammonium ions. As an example, carboxyl-containing carbon nanotubes may be combined with ethylene diamine in an aqueous solution, while carboxyl-containing graphene sheets can be dispersed in an aqueous solution without ethylene diamine. The two solutions can be combined to produce a carbon nanotube-graphene sheet composition. In some embodiments, the carbon nanotube-graphene sheet composition may precipitate from the solution.

In some embodiments, the functionalized graphene sheets include an ammonium ion or substituted ammonium ion, and the functionalized carbon nanotubes do not include (or are substantially free of) ammonium ions or substituted ammonium ions. As an example, carboxyl-containing graphene sheets may be combined with ammonia in an aqueous solution, while carboxyl-containing carbon nanotubes can be dispersed in an aqueous solution without ammonia. The two solutions can be combined to produce a carbon nanotube-graphene sheet composition. In some embodiments, the carbon nanotube-graphene sheet composition may precipitate from the solution.

The relative amount of the carbon nanotubes and graphene sheets that are combined is not particularly limited, and may be the same as any of the ranges or values described above with regard to the composition. For example, the relative amount of carbon nanotubes to graphene sheets by weight can be about 1:5 to about 5:1, or about 1:2 to about 2:1.

At operation 230 "Isolating a composition including carbon nanotubes and graphene sheets", the carbon nanotubes and graphene sheets can optionally be isolated from the solution using standard procedures. For example, the carbon nanotubes and graphene sheets may together precipitate from the solution and then be filtered to obtain a solid composition. As another example, the solvent can be evaporated using, for example, a vacuum or rotary evaporator to obtain a solid composition. As another example, the mixture can be centrifuged to separate the carbon nanotubes and graphene sheets from the solvent. Other known separation techniques can be used and are within the scope of the present application.

Figure 3:
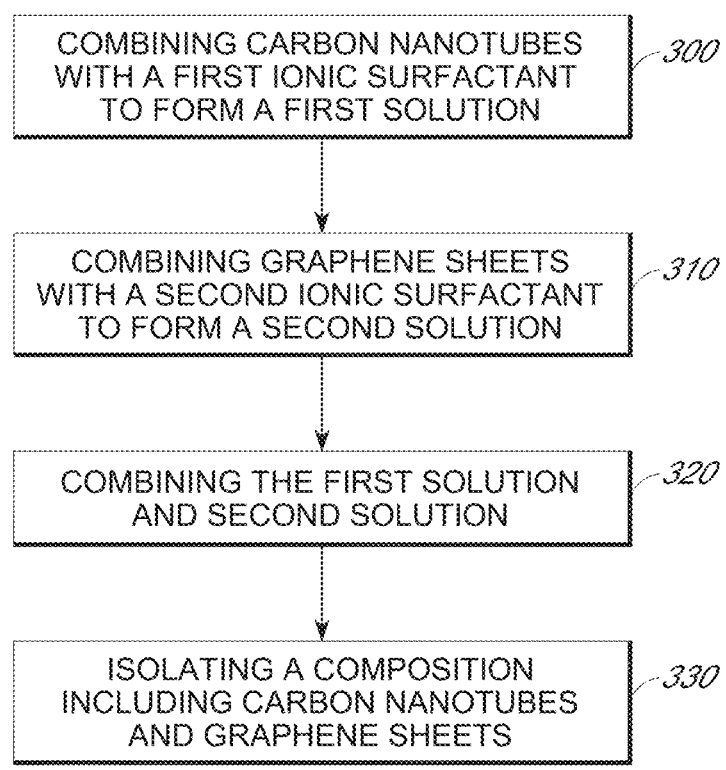
FIG. 3 is a flow diagram showing one example of a process for making compositions within the scope of the present application.

FIG. 3 is a flow diagram showing one example of a process for making the compositions within the scope of the present application. The method of making the composition can include: "Combining carbon nanotubes with a first ionic surfactant to form a first solution", illustrated in block 300; "Combining graphene sheets with a second ionic surfactant to form a second solution", as illustrated in block 310; "Combining the first solution and the second solution", as illustrated in block 320; and "Isolating a composition including carbon nanotubes and graphene sheets", as illustrated in block 330. Although operations 300, 310, 320, and 330 may be performed sequentially, it will be appreciated that one or more of these operations may be performed at about the same time. These operations may also be performed in a different order than is depicted in FIG. 3.

At operation 300 "Combining carbon nanotubes with a first ionic surfactant to form a first solution", carbon nanotubes can be dispersed in a solution with a first ionic surfactant. For example, carbon nanotubes and an ionic surfactant can be sonicated in an aqueous solution. The carbon nanotubes may separate from bundles or ropes when dispersed in the solution. This dispersion may permit carbon nanotubes to be interposed between graphene sheets in the process (e.g., during operation 320 depicted in FIG. 3).

The type of ionic surfactant is not particularly limited, and any surfactant capable of dispersing the carbon nanotubes in the solution may be used. The ionic surfactant can be cationic or anionic. Non-limiting examples of cationic surfactants include octenidine dihydrochloride; alkyltrimethylammonium salts, such as cetyl trimethylammonium bromide (CTAB), dodecyl trimethylammonium bromide (DTAB); cetylpyridinium chloride (CPC); polyethoxylated tallow amine (POEA); benzalkonium chloride (BAC); benzethonium chloride (BZT); 5-bromo-5-nitro-1,3-dioxane; dimethyldioctadecylammonium chloride; and dioctadecyldimethylammonium bromide (DODAB). Non-limiting examples of anionic surfactants include alkyl sulfates, such as ammonium lauryl sulfate, sodium dodecyl sulfate (SDS); alkyl ether sulfates, such as sodium laureth sulfate, sodium myreth sulfate; sulfonates, such as dioctyl sodium sulfosuccinate; sulfonate fluorosurfactants, such as perfluorooctanesulfonate (PFOS), perfluorobutanesulfonate; alkyl benzene sulfonates; phosphates, such as alkyl aryl ether phosphate, alkyl ether phosphate; carboxylates, such as alkyl carboxylates; fatty acid salts (soaps), such as sodium stearate; sodium lauroyl sarcosinate; carboxylate fluorosurfactants: perfluorononanoate, perfluorooctanoate (PFOA or PFO). Other examples of suitable ionic surfactants are disclosed in U.S. Pat. No. 7,074,310. In some embodiments, the ionic surfactant is an alkali salt or an ammonium salt of at least one of a sulfate, a sulfonate, a phosphate, or a carboxylate. In some embodiments, the ionic surfactant is a halide salt of a quaternary ammonium.

The amount of ionic surfactant combined with the carbon nanotubes in the first solution can be sufficient to disperse the carbon nanotubes. The amount of ionic surfactant in the first solution can be, for example, at least about 0.001% by weight, at least about 0.01% by weight, at least about 0.1% by weight, at least about 0.5% by weight, or at least about 1% by weight. The amount of ionic surfactant in the first solution can be, for example, less than about 10% by weight, less than about 5% by weight, less than about 3% by weight, less than about 1.5% by weight, less than about 1% by weight, or less than about 0.5% by weight. In some embodiments, the amount of ionic surfactant in the first solution is 0.001% to 10%. In some embodiments, the amount of ionic surfactant in the first solution is 0.1% to 3%.

The amount of carbon nanotubes in the first solution is not particularly limited. In some embodiments, the first solution includes at least about 0.01 mg/mL of carbon nanotubes. In some embodiments, the first solution includes at least about 0.1 mg/mL of carbon nanotubes.

At operation 310 "Combining graphene sheets with a second ionic surfactant to form a second solution", the graphene sheets can be dispersed in a second solution with an ionic surfactant. For example, graphite can be ultrasonicated in an aqueous solution with an ionic surfactant to yield graphene sheets in the second solution. As another example, graphene sheets or graphene oxide can be mixed in an aqueous solution with an ionic surfactant to form the second solution.

The ionic surfactant combined with the graphene sheets may have an opposite charge relative to the ionic surfactant combined with the carbon nanotubes. In other words, the first surfactant used in operation 300 has an opposite charge relative to the second surfactant used in operation 310. In some embodiments, the first surfactant is an anionic surfactant and the second surfactant is a cationic surfactant. For example, the first surfactant can be sodium dodecyl sulfate and the second surfactant can be cetyl trimethylammonium bromide. In some embodiments, the first surfactant is a cationic surfactant and the second surfactant is an anionic surfactant.

The second ionic surfactant can be selected from any of the surfactants discussed above with regard to operation 300. For example, the second surfactant can be an alkali salt or an ammonium salt of at least one of a sulfate, a sulfonate, a phosphate, or a carboxylate. As another example, the second surfactant can be a halide salt of a quaternary ammonium.

The amount of ionic surfactant combined with the graphene sheets in the second solution can be sufficient to disperse the graphene sheets in the solution. The amount of ionic surfactant in the second solution can be, for example, at least about 0.001% by weight, at least about 0.01% by weight, at least about 0.1% by weight, at least about 0.5% by weight, or at least about 1% by weight. The amount of ionic surfactant in the second solution can be, for example, less than about 10% by weight, less than about 5% by weight, less than about 3% by weight, less than about 1.5% by weight, less than about 1% by weight, or less than about 0.5% by weight. In some embodiments, the amount of ionic surfactant in the second solution is 0.001% to 100%. In some embodiments, the amount of ionic surfactant in the second solution is 0.1% to 3%.

The amount of graphene sheets in the second solution is not particularly limited. In some embodiments, the second solution includes at least about 0.01 mg/mL of graphene sheets. In some embodiments, the second solution includes at least about 0.1 mg/mL of graphene sheets.

At operation 320 "Combining the first solution and the second solution", the first solution containing the carbon nanotubes and the second solution containing the graphene sheets are mixed together. Both the carbon nanotubes and graphene sheets may be sufficiently dispersed in the solvent so that carbon nanotubes can be interposed between the graphene sheets. The carbon nanotubes and graphene sheets may, in some embodiments, precipitate from the solvent upon combining. Without being to any particularly theory, it is believe the oppositely charged surfactants coupled to that carbon nanotubes and graphene sheets may produce favorable polar interactions that form a composition with carbon nanotubes disposed between the graphene sheets.

The relative amount of the carbon nanotubes and graphene sheets that are combined is not particularly limited, and may be the same as any of the ranges or values described above with regard to the composition. For example, the relative amount of carbon nanotubes to graphene sheets by weight can be 1:5 to 5:1, or 1:2 to 2:1.

At operation 330 "Isolating a composition including carbon nanotubes and graphene sheets", the carbon nanotubes and graphene sheets can optionally be isolated from the solution using standard procedures. Generally, the same procedures described above with regard operation 230 depicted in FIG. 2 may be used. For example, the carbon nanotubes and graphene sheets may together precipitate from the solution and then be filtered to obtain a solid composition. As another example, the solvent can be evaporated using, for example, a vacuum or rotary evaporator to obtain a solid composition.

Some embodiments disclosed herein include methods of making a composition including combining graphite with a strong acid, and combining carbon nanotubes with the strong acid. The strong acid may have a pH of less than or equal to about 2, less than or equal to about 1.5, or less than or equal to about 1. Non-limiting examples of suitable strong acids include an aqueous solution of sulfuric acid or perchloric acid. Without being bound to any particular any particular theory, it is believed that the sulfuric acid or perchloric acid can intercalate between the graphite layers or carbon nanotube bundles to form graphene sheets and separate the carbon nanotubes. The carbon nanotubes can be combined with the strong acid before, after, or at about the same time as the graphite. The carbon nanotubes and graphene sheets may be sufficiently dispersed in the strong acid so that the carbon nanotubes can be interposed between the graphene sheets.

The relative amount of the carbon nanotubes and graphene sheets that are combined in the strong acid is not particularly limited, and may be the same as any of the ranges or values described above with regard to the composition. For example, the relative amount of carbon nanotubes to graphene sheets by weight can be about 1:5 to about 5:1, or about 1:2 to about 2:1.

The carbon nanotubes and graphene sheets may, in some embodiments, be isolated from the strong acid to yield a solid composition. In some embodiments, the carbon nanotubes and graphene sheets can be precipitated from the strong acid. For example, the pH of the mixture can be increased by diluting the mixture with a solvent, such as water, or adding a pH modifying agent, such as sodium hydroxide, calcium hydroxide, sodium bicarbonate, and the like. As another example, the solvent can be evaporated using, for example, a vacuum or rotary evaporator. The precipitate can then be removed by, for example, filtration. In some embodiments, the carbon nanotubes and graphene sheets can be isolated using a centrifuge.

The compositions obtained according the any of the methods disclosed herein can be subjected to various post-processing procedures. For example, the composition can be comminuted (e.g., grinding, crushing, ball milling, etc.) into a granular form. In some embodiments, the compositions can be activated using standard carbon processing techniques to increase the surface area or porosity. For example, the composition can be exposed to an acid, strong base, or a salt and then pyrrolized at temperatures of about 300° C. to about 1000° C. In some embodiments, the composition can be dispersed in a binder, such as an expoxy.

Methods of Removing Components from a Fluid

Some embodiments disclosed herein include methods for removing one or more components from a fluid. The method may include contacting the fluid with any of the compositions disclosed in the present application. For example, the composition may include two or more graphene sheets having carbon nanotubes and ionic surfactants disposed between the graphene sheets. As another example, the composition can include two more graphene sheets functionalized with a carboxyl group having carbon nanotubes and ammonium ions disposed between the graphene sheets, where the carbon nanotubes are functionalized with a carboxyl group.

As an example, the method can include passing the fluid through a granulated form of the composition. The composition can be contained in a fluid-permeable enclosure that allows the fluid to contact the composition so that the treated fluid can be readily separated from the composition. Similar procedures may be used to treat a gas.

The fluid that is contacted with the composition can be a liquid or a gas. Non-limiting examples of fluids that can be processed using this method include air, water, such as fresh water (e.g., water from rivers, ponds, lakes, etc.); sewage; and wastewater.

The one or more components removed from the fluid may, in some embodiments, be a heavy metal, a volatile organic compound, or hydrocarbons. Non-limiting examples of component that may be removed include bromate, chlorite, antimony, barium, beryllium, cadmium, chromium, copper, cyanide, fluoride, lead, mercury, nitrate, nitrite, selenium, thallium, acetone, acid blue 9, acid yellow 23, acrylamide, alachlor, atrazine, benzene, benzo(a)pyrene, bromodichloromethane, carbofuran, carbon tetrachloride, chlorobenzene, chlorodane, chloroform, chloromethane, 2,4-dichlorophenoxyacetic acid, dalapon, 1,2-dibromo-3-chloropropane, o-dichlorobenzene, p-dichlorobenzene, 1,2-dichloroethane, 1,1-dichloroethylene, cis-1,2-dichloroethylene, trans-1,2-dichloroethylene, dichlormethane, 1,2-dichloropropane, di(2-ethylhexyl)adipate, di(2-ethylhexyl)phthalate, dinoseb, dioxin(2,3,7,8-TCDD), diquat, endothall, endrin, epichlorohydrin, ethylbenzene, ethylene dibromide, glyphosate, a haloacetic acid, heptachlor, heptachlor epoxide, hexachlorobenzene, hexachlorocyclopentadiene, lindane, methyl-tertiary-butyl ether, methyoxychlor, napthoxamyl(vydate), naphthalene, pentachlorophenol, phenol, picloram, isopropylbenzene, N-butylbenzene, N-propylbenzene, sec-butylbenzene, polychlorinated biphenyls (PCBs), simazine, sodium phenoxyacetic acid, styrene, tetrachloroethylene, toluene, toxaphene, 2,4,5-TP (silvex), 1,2,4-trichlorobenzene, 1,1,1-trichloroethane, 1,1,2-trichloroethane, trichloroethylene, a trihalomethane, 1,2,4-trimethylbenzene, 1,3,5-trimethylbenzene, vinyl chloride, o-xylene, m-xylene, p-xylene, a G-series nerve agent, a V-series nerve agent, bisphenol-A, bovine serum albumin, carbamazepine, cortisol, estradiol-1713, gasoline, gelbstoff, triclosan, ricin, a polybrominated diphenyl ether, a polychlorinated diphenyl ether, a polychlorinated biphenyl or a fullerene.

The composition may absorb at least a portion of one or more components in the fluid. The composition can absorb, for example, at least about 50% by weight of the components in the composition; at least about 70% by weight of the components in the composition; at least about 90% by weight of the components in the composition; or at least about 95% by weight of the components in the composition.

The fluid may be contacted with the composition one, two, three, or more times to remove a desired amount of the component from the fluid. Similarly, the fluid may be contacted with a series of separate compositions, each of the compositions being any of the compositions disclosed in the present application.

Capacitors Including the Carbon Nanotube-Graphene Sheet Compositions

Some embodiments disclosed herein include a capacitor having a first electrode, a second electrode, and a composition disposed between the first electrode and the second electrode. The compositions can be any of the compositions disclosed in the present application. For example, the composition may include two or more graphene sheets have carbon nanotubes and ionic surfactants disposed between the graphene sheets.

Figure 4:
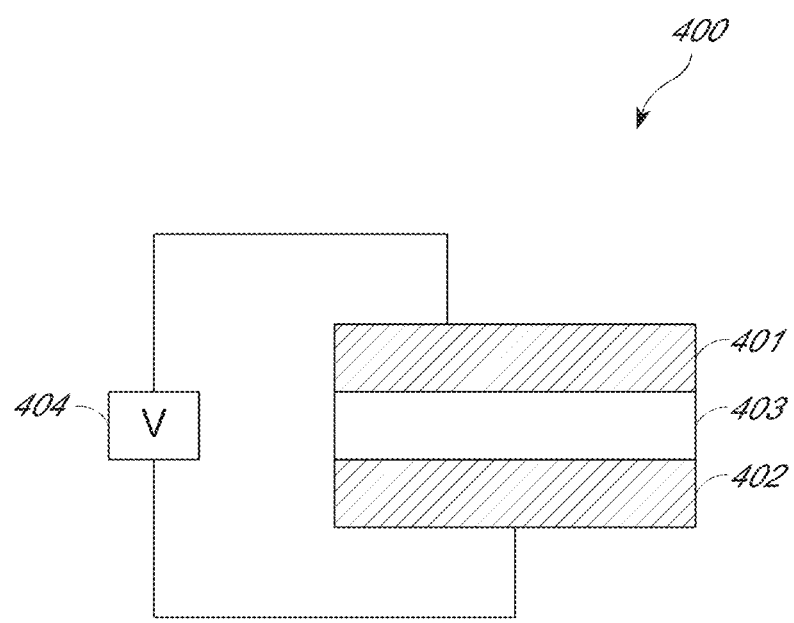
FIG. 4 is a cross-sectional view showing one example of a capacitor having the carbon nanotube-graphene sheet composition.

FIG. 4 is a cross-sectional view showing one example of a capacitor with the carbon nanotube-graphene sheet composition arranged in accordance with at least some examples presented herein. Composition 403 is disposed between first electrode 401 and second electrode 402 to form capacitor 400. Composition 403 can be any of the carbon nanotube-graphene sheet compositions described in the present application, such as a composition obtained by the methods depicted in FIG. 2 or FIG. 3. In some embodiments, the composition includes the carbon nanotubes and graphene sheets dispersed within a polymer having a high dielectric strength (e.g., at least about 10 MV/m or at least about 25 MV/m). The polymer can be, in some embodiments, a polyolefin, such a polyethylene, polypropylene, polybutene-1, polymethylpentene, and the like.

As shown, first electrode 401 and second electrode 402 may be coupled to an optional voltage source 404. The electrodes 401, 402 may be formed from any conventional conducting or semi-conducting materials. For example, the capacitor 400 can be formed in a silicon-insulator-silicon (SIS) structure, wherein both of the electrodes 401, 402 may be formed of polysilicon. Also, a metal-insulator-silicon (MIS) capacitor structure or a metal-insulator-metal (MIM) capacitor structure can also be used. For the MIS capacitor structure, one electrode may be formed of polysilicon and one electrode may be formed of metal or metal oxide. For the MIM capacitor structure, both of the electrodes may be formed of metal or metal oxide.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

EXAMPLES

Additional embodiments are disclosed in further detail, which are not intended in any way to limit the scope of the claims.

Example 1: Forming Functionalized Multi-Walled Carbon Nanotubes 1 g of pristine multi-walled carbon nanotubes were mixed with 100 mL of $HNO_3/H_2SO_4$ (v/v=1:3). The sample was sonicated for 60 min and stirred for 24 hours at 150° C. After this treatment, the mixture was neutralized with $H_2O$ and filtered through a polycarbonate filter or centrifuged to collect the carboxyl-functionalized carbon nanotubes. The samples were subsequently rinsed and dried under vacuum at 110° C. The samples could be readily dispersed in aqueous solution to produce a dark suspension.

These results show that multi-walled carbon nanotubes can be functionalized to produce a water-dispersible material for further processing to form the carbon nanotube-graphene compositions.

Example 2: Forming Functionalized Single-Walled Carbon Nanotubes

The process was in Example 1 was repeated except that 1 g of single-walled carbon nanotubes were used rather than multi-walled carbon nanotubes. The carbon nanotubes could be readily dispersed in aqueous solution to produce a dark suspension.

These results show that single-walled carbon nanotubes can be functionalized to produce a water-dispersible material for further processing to form the carbon nanotube-graphene compositions.

Example 3: Forming Functionalized Graphene Sheets 1 g of powdered flake graphite and 30 g of sodium nitrate were added to 300 mL of sulfuric acid and mixed at 10° C. 3 g of potassium permanganate was added to the suspension and stirred for 60 h. The suspension was then diluted with warm water and treated with hydrogen peroxide. The suspension was filtered and washed with water until the pH was about 5 to 8. The resulting graphene sheets were then dried. The carboxyl-functionalized graphene sheets could be dispersed in aqueous solution to produce a dark suspension.

These results show that functionalized graphene sheets can be obtain from graphite. The functionalized graphene sheets are water-dispersible for further processing to form the carbon nanotube-graphene compositions.

Example 5: Forming Amino-Functionalized Multi-Walled Carbon Nanotubes 1 g of the functionalized multi-walled carbon nanotubes from Example 1 mixed with 100 mL of thionyl chloride. The resulting suspension is mixed for 24 hours at 120° C. and then filtered or centrifuged to collect the carbon nanotubes. 1 part by weight of the carbon nanotubes are further mixed with 10 parts by weight of ethylene diamine for 60 hours at 80° C. The sample was washed with ethanol and then dried. The amino-functionalized carbon nanotubes could be dispersed in aqueous solution at a pH of about 2 to produce a dark suspension.

These results show that the functionalized multi-walled carbon nanotubes can be modified with an ammonium and dispersed in solution for further processing.

Example 6: Forming Amino Functionalized Single-Walled Carbon Nanotubes

The process of Example 5 was repeated except that the functionalized single-walled carbon nanotubes from Example 2 were used. The amino-functionalized carbon nanotubes could be dispersed in aqueous solution at a pH of about 2 to produce a dark suspension. These results show that the functionalized single-walled carbon nanotubes can be modified with an ammonium and be dispersed in solution for further processing.

Example 7: Forming Amino-Functionalized Graphene Sheets

The process of Example 5 was repeated except that the functionalized graphene sheets from Example 3 were used. The amino-functionalized graphene sheets could be dispersed in aqueous solution at a pH of about 2 to produce a dark suspension. These results show that the functionalized graphene sheets can be modified with an ammonium and dispersed in solution for further processing.

Example 8: Forming Carbon Nanotube-Graphene Sheet Composition 1 g of amino-functionalized multi-walled carbon nanotubes from Example 5 was dispersed in 1000 mL of water by sonication. 1 g of functionalized graphene sheets from Example 3 was also separately dispersed in 1000 mL of water by sonication. The two solution were then mixed together and stirred for 60 hours. This mixture was then kept static for 48 hours to produce a dark precipitate.

Figure 5A:
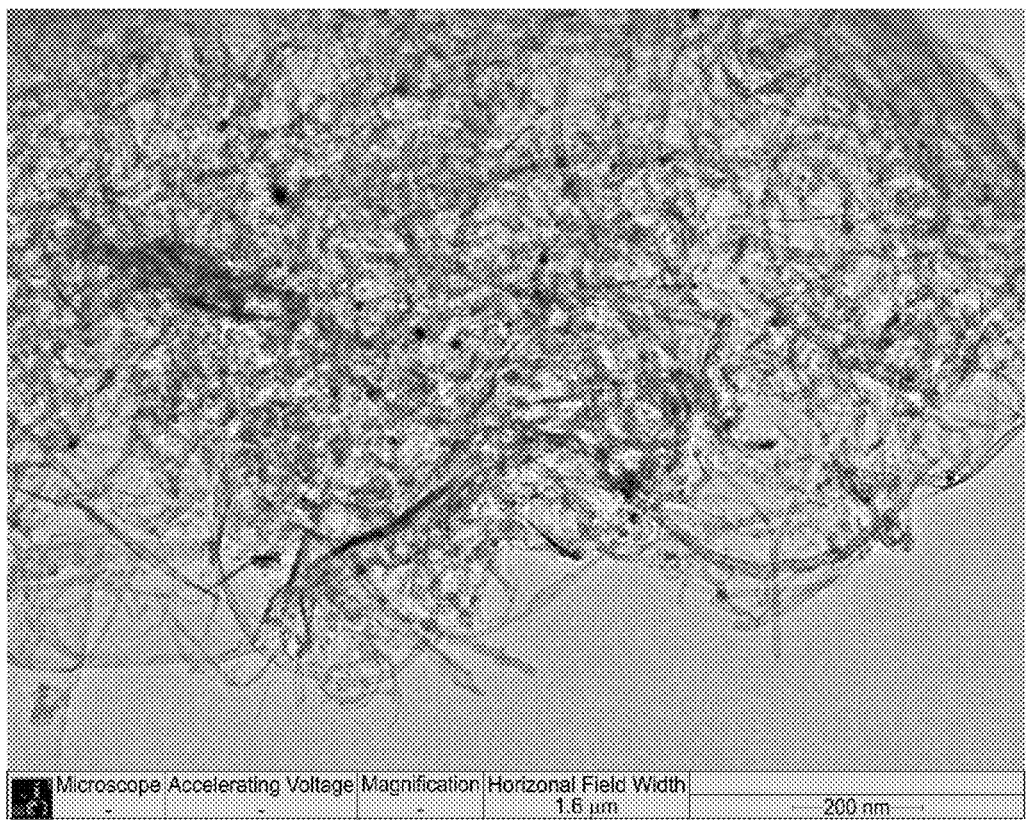
FIG. 5A shows a transmission election microscopy image of the resulting composition from Example 8.

The precipitate was filtered or centrifuged, dried, and then inspected using transmission electron microscopy (TEM). FIG. 5A shows a transmission election microscopy image of the resulting composition from Example 8. These results show that the multi-walled carbon nanotubes are disposed between the graphene sheets.

Examples 9-12: Forming Carbon Nanotube-Graphene Sheet Composition

The process in Example 8 was repeated using varying starting materials and weight ratios as shown in TABLE 1 below.

TABLE 1

Figure 5B:
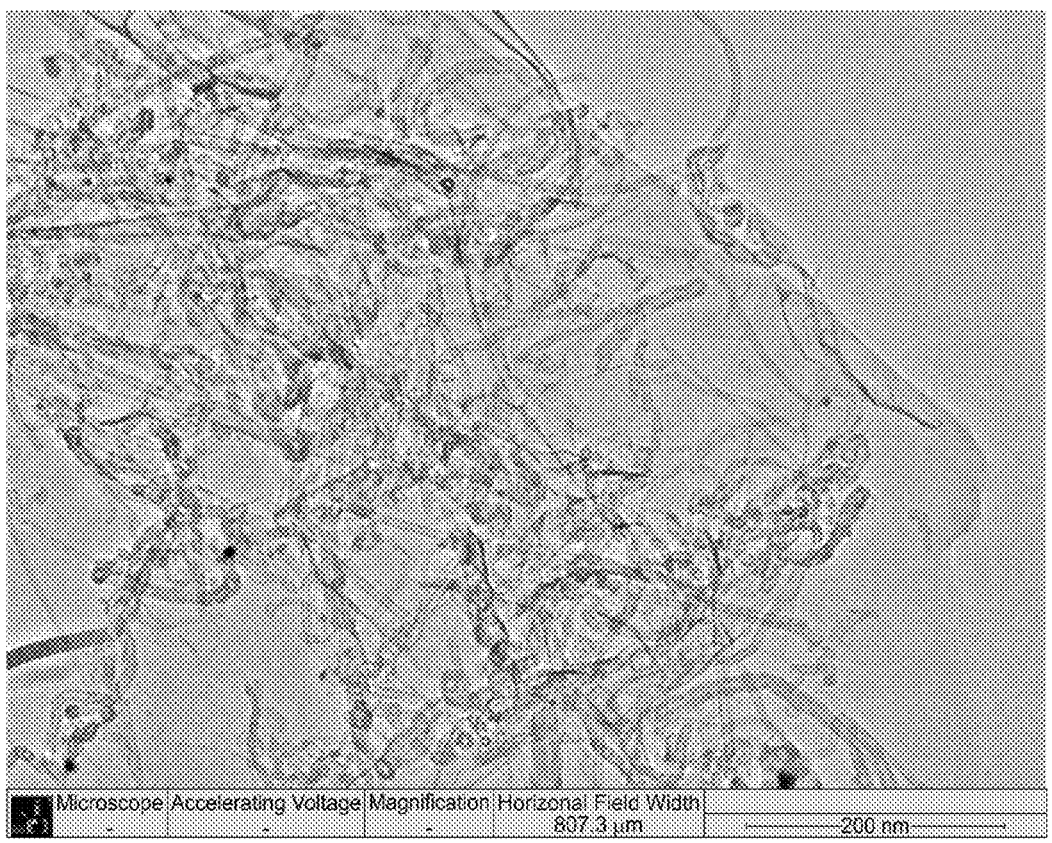
FIG. 5B shows a transmission election microscopy image of the resulting composition from Example 9.
Figure 5C:
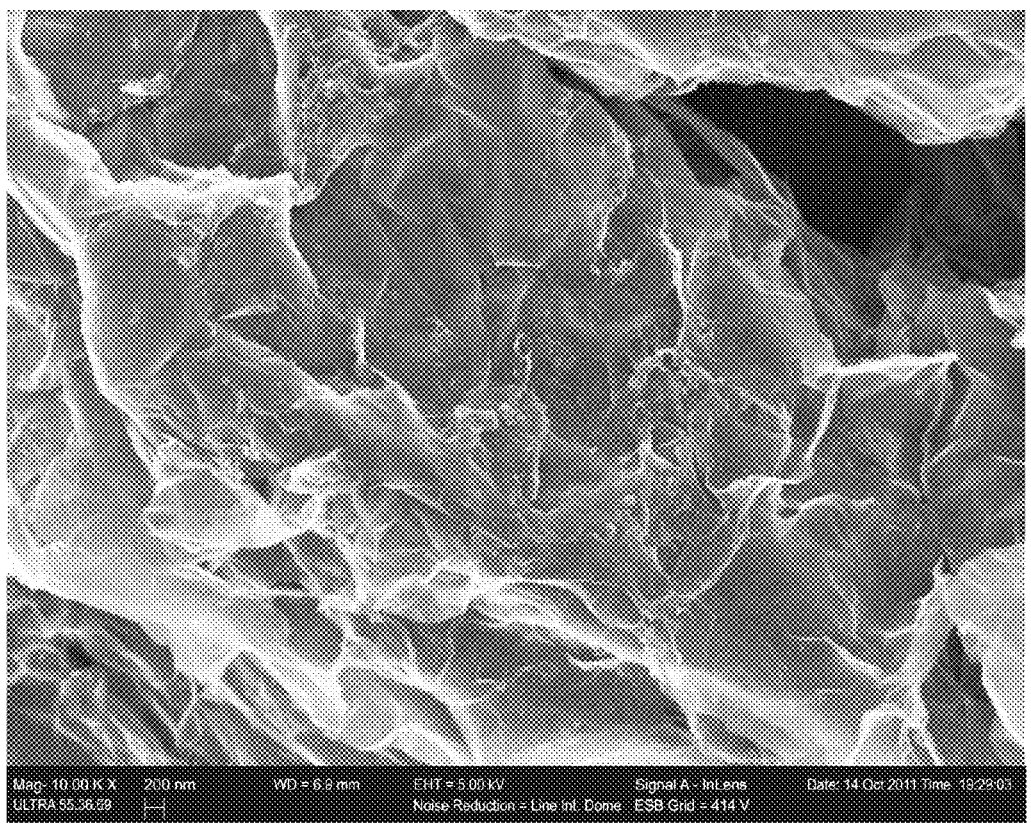
FIG. 5C shows a transmission election microscopy image of the resulting composition from Example 10.
Figure 5D:
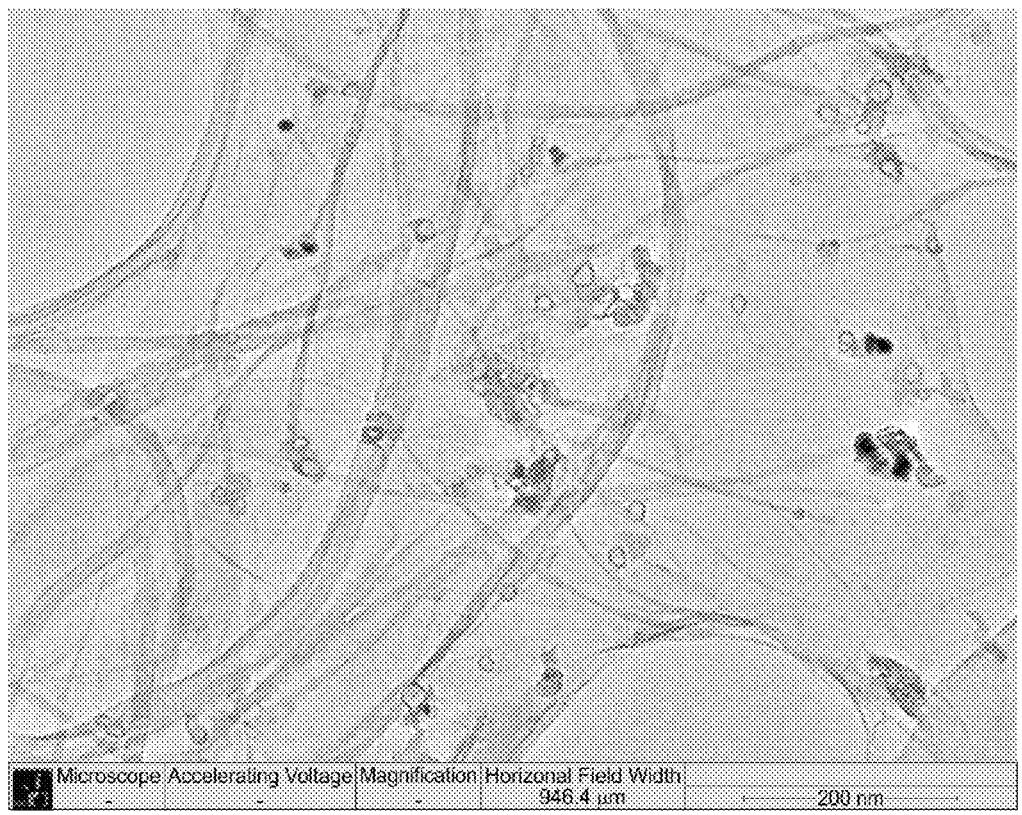
FIG. 5D shows a transmission election microscopy image of the resulting composition from Example 11.
Figure 5E:
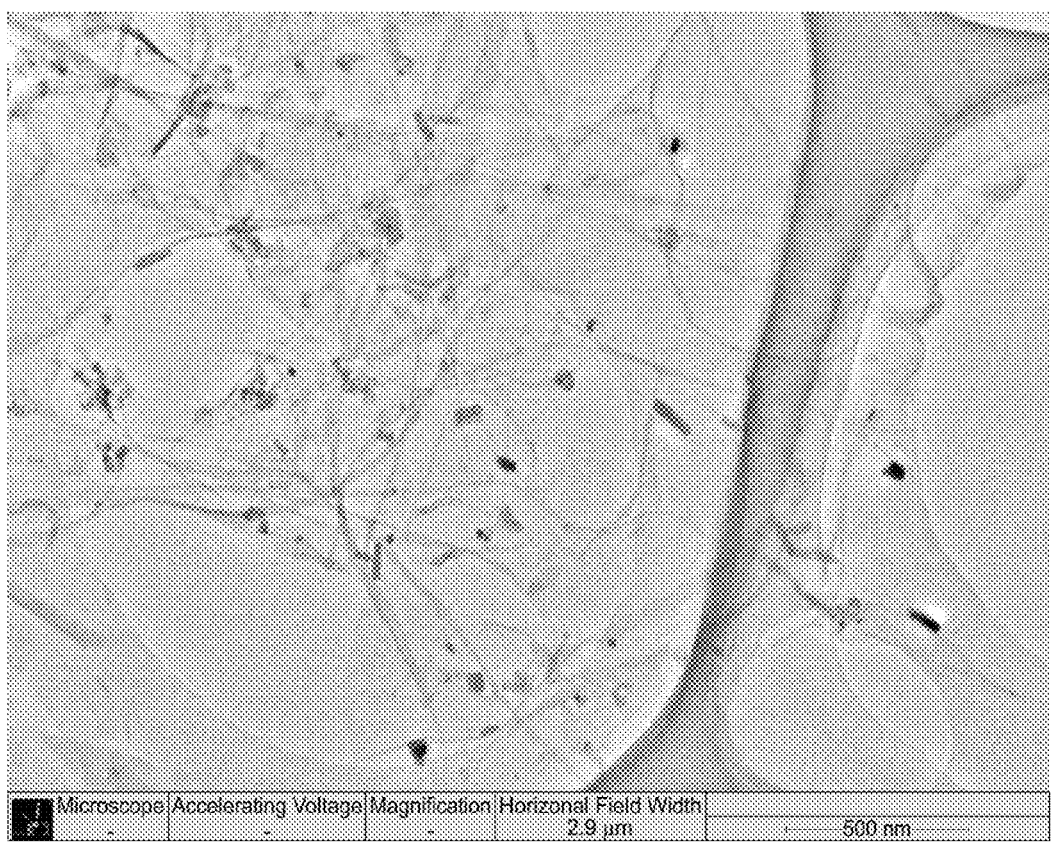
FIG. 5E shows a transmission election microscopy image of the resulting composition from Example 12.

| Summary of Examples 9-12 | | | | |
|---|---|---|---|---|
| Example | Carbon Nanotube Source | Graphene Sheet Source | Weight Ratio (CNT:Graphene) | TEM Image |
| 9 | Example 5 | Example 3 | 1:2 | FIG. 5B |
| 10 | Example 5 | Example 3 | 1:5 | FIG. 5C |
| 11 | Example 6 | Example 3 | 1:1 | FIG. 5D |
| 12 | Example 6 | Example 3 | 1:2 | FIG. 5E |

These results show that the various weight ratios of materials can be used to successfully dispose carbon nanotubes between graphene sheets. Furthermore, the results show that single-walled nanotubes can be used as an alternative to multi-walled carbon nanotubes.

Example 13: Activated Carbon Nanotube-Graphene Sheet Compositions 1 g of carbon nanotube-graphene sheet composition prepared according to Example 11 was dispersed in a 100 mL aqueous solution having 7M KOH and stirred for 6 hours and then kept under static soaking conditions at room temperature for about 24 hours. This mixture was then dried at 70° C. for about 48 hours. The dried mixture was heated at 5° C./min. to 8000 and then maintained for 2 hours with an argon flow of 150 sccm and working pressure of 300 Torr. The sample was then cooled down and washed until a pH of about 7 was achieved.

These results show that the carbon nanotube-graphene sheets compositions can be subjected to activation processes to increase surface area of the composition.

Example 14: Surface Area Measurements

The Brunauer-Emmertt-Teller (BET) surface area was measured for various materials as shown in the TABLE 2 below. The surface area was determined from nitrogen sorption isotherms which were measured at −196° C. on a Micrometrics ASAP 2010 analyzer. The Barret, Joyner and Halender (BJH) adsorption average pore diameter and desorption average pore diameter was calculated as 4V/A, where V is the cumulate volume of pores and A is the cumulate surface area of pores measured between 1.7 nm and 300 nm diameters.

TABLE 2

Summary of Surface Area Measurements

| Sample | BET Surface Area (m$^2$/g) | BJH Adsorption Average Pore Width (nm) | BJH Adsorption Average Pore Diameter (nm) | BJH Desorption Average Pore Diameter (nm) |
|---|---|---|---|---|
| Example 1 | 350 | 14.1 | 17.5 | 15.7 |
| Example 2 | 570 | 6.7 | 6.6 | 6.7 |
| Example 3 | 5.2 | 2.7 | 2.9 | Cannot be Determined |
| Example 8 | 463 | 4.6 | 5.0 | 5.8 |
| Example 11 | 720 | 3.1 | 4.8 | 4.5 |
| Example 13 | 1915 | 2.8 | 3.1 | 3.0 |

These results show that the carbon nanotube-graphene sheet compositions exhibit increased surface area. Furthermore, the results show that activation may further increase surface area.

Example 15: Capacitance Measurements

The electrochemical capacitance was also measured under a three-electrode cell configuration at room temperature. The working electrodes were formed by pressing prepared powders of Ni foam to make electrodes.

TABLE 3

Summary of Capacitance Measurements

| Sample | Capacitance (F/g) |
|---|---|
| Example 1 | 30.6 |
| Example 2 | 89.3 |
| Example 3 | 54 |
| Example 8 | 148 |
| Example 9 | 104 |
| Example 10 | 75 |
| Example 11 | 116 |
| Example 12 | 262 |

These results show that the hybrid and activated compositions can provide improved capacitance.

Figure 6:
FIG. 6 is a transmission electron microscopy image of the resulting composition from Example 16.

Examples 16: Forming Carbon Nanotube-Graphene Sheet Composition 1 g of graphite oxide was sonicated for 24 hours in 1000 mL of water containing 1 g of cetyltrimethyl ammonium bromide. 1 g of single-walled carbon nanotubes was sonicated for 24 hours in 1000 mL of water containing 1 g of sodium dodecyl sulfate. The two suspensions were then combined to produce the composition. FIG. 6 is a transmission electron microscopy image of the composition produced according to Example 16. The results show that surfactants can be successfully used to dispose carbon nanotubes between graphene sheets.

Figure 7:
FIG. 7 is a transmission electron microscopy image of the resulting composition from Example 17.
Figure 3:
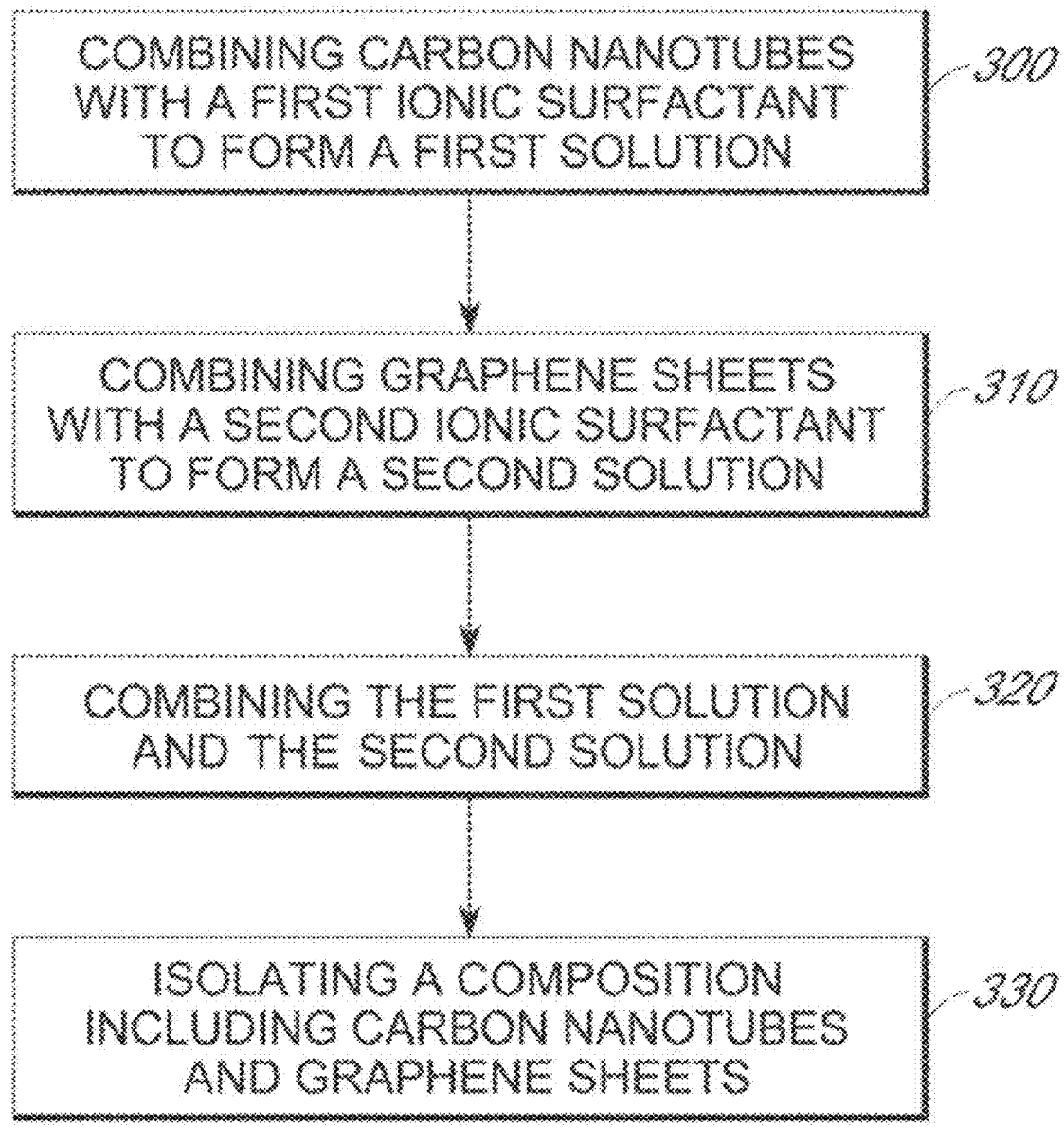

Examples 17: Forming Carbon Nanotube-Graphene Sheet Composition 1 g of single-walled carbon nanotubes was dispersed in 500 mL of $H_2SO_4$ by sonication for 60 minutes. 1 g of graphite was separately dispersed in 500 mL of $H_2SO_4$ by sonication for 60 minutes. The two suspensions were then combined to produce the composition. FIG. 7 is a transmission electron microscopy image of the composition produced according to Example 17. The results show that surfactants can be successfully used to dispose carbon nanotubes between graphene sheets.

What is claimed is:

1. A composition comprising two or more graphene sheets, wherein the two or more graphene sheets are functionalized with a first negatively charged group;
   carbon nanotubes disposed between the two or more graphene sheets, wherein the carbon nanotubes are functionalized with a second negatively charged group;
   wherein a weight ratio of the two or more graphene sheets to the carbon nanotubes is in the range of 1/5 to 5/1; and
   wherein the composition further comprises an ammonium ion or a substituted ammonium ion disposed between the two or more graphene sheets.

2. The composition of claim 1, wherein a net electrical charge of the two or more graphene sheets and the carbon nanotubes is negative.

3. The composition of claim 1, wherein at least one of the first and second negatively charged groups are a free acid of a group that comprises a carboxyl group, a boronic acid group, a phosphonic acid group, or a sulfamic acid group.

4. The composition of claim 1, further comprising an anionic surfactant and a cationic surfactant, wherein the anionic surfactant and the cationic surfactant are disposed between the two or more graphene sheets.

5. The composition of claim 4, wherein the cationic surfactant is selected from the group of octenidine dihydrochloride, cetylpyridinium chloride (CPC), polyethoxylated tallow amine (POEA), benzethonium chloride (BZT), 5-bromo-5-nitro-1,3-dioxane, dimethyldioctadecylammonium chloride, and dioctadecyldimethylammonium bromide.

6. The composition of claim 4, wherein the anionic surfactant is selected from the group of alkyl sulfates, alkyl ether sulfates, sulfonates, sulfonate fluorosurfactants, alkyl benzene sulfonates, phosphates, carboxylates, fatty acid salts, and carboxylate fluoro surfactants.

7. The composition of claim 4, wherein an amount by weight ratio of ionic surfactants to a total amount by weight of the carbon nanotubes and the two or more graphene sheets have an average surface area in the range of 1:10 to 10:1.

8. The composition of claim 1, wherein the carbon nanotubes are single-walled carbon nanotubes, double-walled carbon nanotubes, multi-walled carbon nanotubes, or any combination thereof.

9. The composition of claim 1, wherein the composition has a capacitance of at least about 75 F/g.

10. The composition of claim 1, wherein the composition is porous with an average pore diameter of less than or equal to about 6 nm.

11. The composition of claim 1, wherein the carbon nanotubes are overlapping, intertwined, or forming ropes and disposed between the two or more graphene sheets.

12. The composition of claim 1, wherein the size of the two or more graphene sheets have an average surface area in the range of 100 nm² to 1000 nm².

13. The composition of claim 1, wherein the substituted ammonium ion is selected from the group of a primary ammonium ion, a secondary ammonium ion, a tertiary ammonium ion, or a quaternary ammonium ion.

14. The composition of claim 1, wherein the substituted ammonium ion is represented by formula (1):

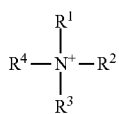

(I)

where $R^1$, $R^2$, $R^3$, and $R^4$ are each independently hydrogen, $C_1$-$C_{12}$ hydrocarbon, or an $C_5$-$C_{10}$ aryl carbons, and wherein $R^1$ and $R^2$ are taken together to form a nitrogen-containing heterocycle.

15. The composition of claim 1, wherein the substituted ammonium ion further comprises of a protonated pyrrolidine or a polyamine having two or more cationic amino groups covalently bonded to a hydrocarbon.

16. The composition of claim 1, wherein the substituted ammonium ion further comprises of protonated forms of piperazine, alkylene diamines, or $NH_3$—$(CH_2)_n$—$NH_3$, wherein n is 1 to 12.

17. The composition of claim 16, wherein the alkylene diamines are selected from the group of ethylenediamine, 1,3-propylenediamine, 1,4-butylenediamine, diethylenetriamine, triethylenetetramine, and tetraethylenetetramine.

18. The composition of claim 1, wherein the composition is in a suspension, a liquid, a solid, or in a granular form.

19. The composition of claim 18, wherein the granular composition has a particle size in the range of 100 μm to 1 mm.

20. The composition of claim 1, wherein the total amount of the two or more graphene sheets in the composition is in the range of 1% to 90% by weight.

21. The composition of claim 1, wherein the total amount of the carbon nanotubes in the composition is in the range of 1% to 90% by weight.

22. The composition of claim 1 further comprises of additional materials wherein the additional materials include polymers, plasticizers, organic solvents, binders, sulfur, and metal oxide nanoparticles.

23. The composition of claim 22, wherein the amount of the additional material in the composition is in the range of 1% by weight to 25% by weight.

24. The composition of claim 1, wherein the composition has a BET surface area in the range of 400 m²/g to 2500 m²/g.

* * * * *

UNITED STATES PATENT AND TRADEMARK OFFICE
CERTIFICATE OF CORRECTION

PATENT NO. : 9,878,302 B2
APPLICATION NO. : 14/428186
DATED : January 30, 2018
INVENTOR(S) : Wei et al.

Page 1 of 2

It is certified that error appears in the above-identified patent and that said Letters Patent is hereby corrected as shown below:

In Fig. 3, Sheet 3 of 11, for Tag "320", Line 1, delete "AND SECOND" and insert -- AND THE SECOND --, as shown on the attached sheet.

In Column 1, below Title, Line 4, insert -- CROSS-REFERENCE TO RELATED APPLICATIONS --, therefor.

In Column 5, Line 51, delete "(SUS);" and insert -- (SDS); --, therefor.

In Column 6, Line 59, delete "100% by weight," and insert -- 10% by weight, --, therefor.

In Column 7, Line 26, delete "100% by weight," and insert -- 10% by weight, --, therefor.

In Column 13, Line 36, delete "according the" and insert -- according to the --, therefor.

In Column 13, Line 46, delete "expoxy." and insert -- epoxy. --, therefor.

In Column 14, Line 1, delete "include air," and insert -- include air; --, therefor.

In Column 15, Line 38, delete "recitation no" and insert -- recitation, no --, therefor.

In Column 15, Line 60, delete "general such" and insert -- general, such --, therefor.

In Column 15, Line 67, delete "general such" and insert -- general, such --, therefor.

Signed and Sealed this
Twenty-fourth Day of April, 2018

Andrei Iancu
*Director of the United States Patent and Trademark Office*